W. L. BRADLEY.
Apparatus for Treating Offal.
No. 134,844. Patented Jan. 14, 1873.
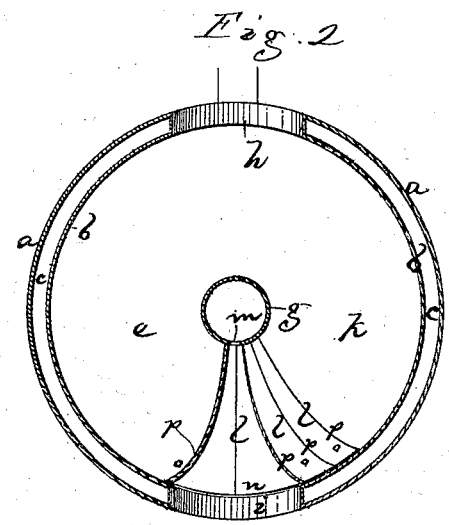
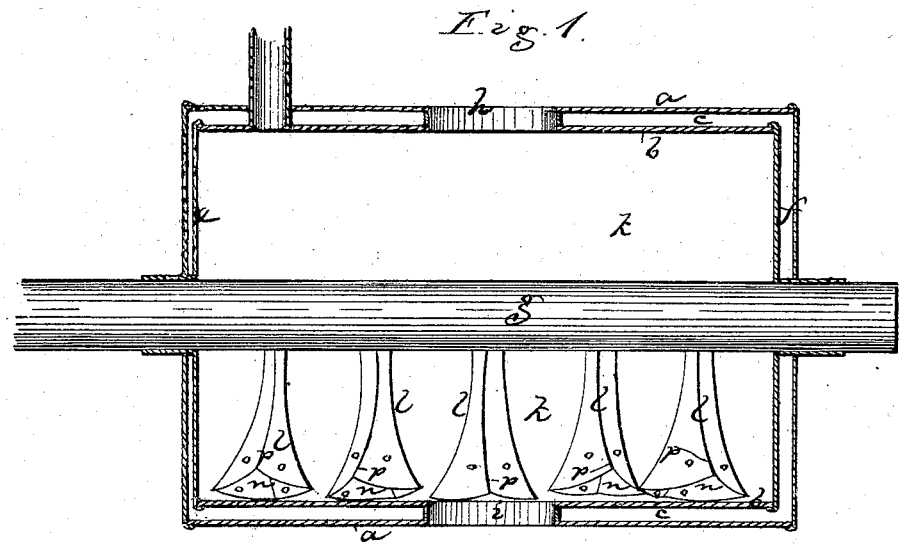
Witnesses.
M. W. Frothingham.
L. H. Latimer.
Inventor.
William L. Bradley,
By his Attys.
Crosby & Gould.

UNITED STATES PATENT OFFICE.

WILLIAM L. BRADLEY, OF BOSTON, MASSACHUSETTS.

IMPROVEMENT IN APPARATUS FOR TREATING OFFAL.

Specification forming part of Letters Patent No. 134,844, dated January 14, 1873.

*To all whom it may concern:*

Be it known that I, WILLIAM L. BRADLEY, of Boston, in the county of Suffolk and State of Massachusetts, have invented an Improvement in Treating Refuse Animal Matter; and I do hereby declare that the following, taken in connection with the drawing which accompanies and forms part of this specification, is a description of my invention sufficient to enable those skilled in the art to practice it.

In treating refuse animal matters to deprive them of moisture, it is customary, to some extent, to subject them to the action of heat in a rotary drum or cylinder. None of the methods in use produce wholly satisfactory results; and my invention relates to the combination, with a drum or cylinder mounted upon a rotary hollow shaft, or rotating upon a hollow shaft, (which drum may be jacketed by an annular steam-chamber,) of a series of hollow arms extending from the hollow shaft radially into and across the drying-chamber, through which arms dry hot air is driven under pressure into the chamber and directly into and upon the mass of matter in the drum to be dried, the air being charged with vapor by its contact with the wet material, and the vapor escaping from the drum through suitable outlet-pipes, and passing off to suitable condensing apparatus and to a suitable furnace for consuming the combustible gases. The cylinder may revolve around the hollow axle and its radial air-pipes or arms, or the cylinder may remain stationary and the axle and its arms be made to rotate; in either case the hot air under pressure being driven into the drum-chamber and through the matter with which it is charged. My invention consists in the drier cylinder or drum thus made, with the hollow air-conducting axle and radial arms or spokes for directing the air.

The drawing represents a drier-cylinder embodying the invention.

Figure 1 shows an axial section of the cylinder; Fig. 2, a cross-section of it.

*a* denotes the outer plate of the cylinder; *b*, the inner plate; *c*, the annular steam-space between the two. *e f* denote the opposite heads of the cylinder. Through the centers of these heads passes the hollow shaft or axle *g*, the shaft being properly journaled in the heads. *h i* denote suitable man-holes for charging and unloading the cylinder, the main space *k* within the drum constituting the chamber which is charged with the material to be treated, and the man-holes being covered by tight man-holes plates when the apparatus is working. One end of the hollow shaft *g* is closed, and connecting with the opposite end is a pipe leading from a hot-air blast. Within the chamber *k* the radial hollow arms *l* extend from the shaft, and into each of these arms an opening, *m*, is made from the shaft *g*, the outer end of the arm being open so that the hot air driven through the arm escapes from it into the mass within the drum. Each arm *l* is preferably made small at its junction with the shaft, and flares from said junction or inner end to its outer end or mouth, having the quadrangular trumpet-shaped mouth *n*, the width of the outer part of each arm constituting of the sides *o* of the assembled arms lifters to move forward and overturn the material, and the angle *p* of each forming a harrow or plough to cut through and mix up the material, the wide mouths also forming large outlets to disseminate the currents of air upon and throughout the moving mass of matter. These arms are preferably disposed in an angular arrangement, substantially as are the lifter-blades shown in my patent No. 121,112, by which disposition the rotative movement of the drum in one direction, (the shaft and arms being stationary,) or of the shaft and arms in one direction, (the drum being stationary,) will move the material from the center of the chamber toward its opposite ends, while rotative movement in the opposite direction will reverse the movement of the mass and cause it to travel toward the center, it having the outward movement (particularly) just after the drum is charged, (to carry the matter from the center,) and the opposite movement when the charge is to be removed to bring it to the man-holes, the drum and shaft having continuous repetitions of the opposite rotative movements to carry the mass to and fro for its thorough treatment.

The vaporized air escapes from the drum through any suitable exhaust-outlets, and by driving a continuous supply of heated air through the drum the material will be very rapidly dried.

But one series of arms are shown, but in practice the shaft will be preferably provided with two or more.

When the shaft and arms are arranged to rotate a cut-off plate may be used that will close the air-inlets to the arms when the arms are uppermost, the air being then driven only into the mass.

I do not claim a jacketed cylinder and hollow stirrers, as these have been heretofore used; but

I claim—

1. In combination with the drum or cylinder and its hollow shaft or axle $g$, the air discharging and directing radial arms $l$, substantially as described.

2. The air-directing arms, formed with the flaring sides $o$, mouths $n$, and angles $p$, substantially as shown and described.

WM. L. BRADLEY.

Witnesses:
FRANCIS GOULD,
M. W. FROTHINGHAM.